(12) United States Patent
Karame et al.

(10) Patent No.: US 9,735,959 B2
(45) Date of Patent: Aug. 15, 2017

(54) METHOD AND SYSTEM FOR ENFORCING ACCESS CONTROL POLICIES ON DATA

(71) Applicant: NEC EUROPE LTD., Heidelberg (DE)

(72) Inventors: Ghassan Karame, Heidelberg (DE); Claudio Soriente, Zurich (CH); Srdjan Capkun, Zurich (CH)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/786,999

(22) PCT Filed: Apr. 24, 2014

(86) PCT No.: PCT/EP2014/058398
§ 371 (c)(1),
(2) Date: Oct. 26, 2015

(87) PCT Pub. No.: WO2014/174045
PCT Pub. Date: Oct. 30, 2014

(65) Prior Publication Data
US 2016/0087793 A1 Mar. 24, 2016

(30) Foreign Application Priority Data
Apr. 24, 2013 (EP) .................................. 13165172

(51) Int. Cl.
*H04L 29/06* (2006.01)
*H04L 9/08* (2006.01)
*G06F 21/62* (2013.01)

(52) U.S. Cl.
CPC .......... *H04L 9/085* (2013.01); *G06F 21/6218* (2013.01); *H04L 63/20* (2013.01)

(58) Field of Classification Search
CPC ...................................................... H04L 9/085
See application file for complete search history.

(56) References Cited

U.S. PATENT DOCUMENTS 5,937,066 A * 8/1999 Gennaro ............... H04L 9/0841
380/286
6,490,680 B1 * 12/2002 Scheidt ............... H04L 63/0442
380/286

(Continued)

OTHER PUBLICATIONS

Valer Canda; Tran Van Trung: "A New Mode of using All-or-Nothing Transforms", Tatra Mountains Mathematical Publications, Dec., 2006, pp. 159-168, XP002728449, Bratislava ISSN: 1338-9750, hereinafter "Valer".*

(Continued)

*Primary Examiner* — Shawnchoy Rahman
(74) *Attorney, Agent, or Firm* — Leydig, Voit & Mayer, Ltd.

(57) ABSTRACT

A method for enforcing access control policies on data owned by a plurality of users includes evaluating the access control policies of users, applying a collusion resistant sharing scheme for generating key shares of an encryption key and delegating the key shares to one or more designated users based on a result of the evaluation. The data is securely dispersed by applying an encryption scheme on all parts of the data to be encrypted to produce encrypted data shares. The encryption scheme is provided such that for decryption of the encrypted data, the encryption key and at least a predetermined number of data shares are provided. Each data share is delegated to one or more designated users, and the data shares and the key shares are distributed to the respective designated users.

17 Claims, 3 Drawing Sheets

$g^x, \{x_1, \ldots, x_n\} \leftarrow$ SS.Share$(-, t, n)$.

Pick cyclic group $G$ of prime order $q$ where DL is hard; let $\langle g \rangle = G$. Pick random $x \in Z_q$ and set the secret to $g^x$. Pick random $t-1$-degree polynomial $X$ with coefficients in $Z_q$, such that $X(0) = x$. Set $x_i = X(i)$.

$s' \leftarrow$ SS.Combine$(\{x_{i_1}, \ldots, x_{i_l}\})$.

Compute $$s' = g^{\sum_{p=1}^{p=i} x_{i_p} \lambda_p}$$

where $\lambda_p = \prod_{1 \leq k \leq l}^{k \neq p} \frac{x_{i_k}}{x_{i_k} - x_{i_p}}$.

(56) References Cited

U.S. PATENT DOCUMENTS

| | | | | |
|---|---|---|---|---|
| 7,111,173 | B1* | 9/2006 | Scheidt | G06F 21/32 380/46 |
| 2003/0046213 | A1* | 3/2003 | Vora | G06Q 20/00 705/36 R |
| 2006/0062315 | A1* | 3/2006 | Luz | H04K 1/006 375/260 |
| 2010/0005302 | A1* | 1/2010 | Vishnu | H04L 9/085 713/171 |
| 2010/0037055 | A1* | 2/2010 | Fazio | H04L 9/3218 713/171 |
| 2010/0037056 | A1* | 2/2010 | Follis | G06F 11/1464 713/171 |
| 2012/0221854 | A1* | 8/2012 | Orsini | G06F 21/606 713/167 |
| 2017/0054756 | A1* | 2/2017 | Jones | H04L 63/20 |

OTHER PUBLICATIONS

Marnas, Stelios I., Lefteris Angelis, and George L. Bleris. "All-or-nothing transforms using quasigroups." Proc. 1st Balkan Conference in Informatics. 2003.*

Hanaoka, Goichiro, et al. "An efficient hierarchical identity-based key-sharing method resistant against collusion-attacks." Advances in Cryptology—ASIACRYPT'99 (1999): 348-362.*

Liu, Jing, and Bo Yang. "Collusion-resistant multicast key distribution based on homomorphic one-way function trees." IEEE Transactions on Information Forensics and Security 6.3 (2011): 980-991.*

Somchart Fugkeaw: "Achieving privacy and security in multi-owner data outsourcing", Digital Information Management (ICDIM), 2012 Seventh International Conference on, IEEE, Aug. 22, 2012 (Aug. 22, 2012), pp. 239-244, XP032271877.

Qian Wang et al: "Dependable and Secure Sensor Data Storage with Dynamic Integrity Assurance", ACM Transactions on Sensor Networks, ACM, 2 Penn Plaza, Suite 701 New York NY 10121-0701 USA, vol. 8, No. 1, Aug. 1, 2011 (Aug. 1, 2011), pp. 1-24, XP058006327.

Qiwei Lu et al: "Secure Collaborative Outsourced Data Mining with Multi-owner in Cloud Computing", Trust, Security and Privacy in Computing and Communications (TRUSTCOM), 2012 IEEE 11$^{TH}$ International Conference on, IEEE, Jun. 25, 2012 (Jun. 25, 2012), pp. 100-108, XP032233403.

Xingwen Zhao et al: "Achieving dynamic privileges in secure data sharing on cloud storage", Security and Communication Networks, Feb. 1, 2013 (Feb. 1, 2013), pp. n/a-n/a, XP055133935.

* cited by examiner $g^x, \{x_1, \ldots, x_n\} \leftarrow \text{SS.Share}(-, t, n)$.

Pick cyclic group $G$ of prime order $q$ where DL is hard; let $\langle g \rangle = G$. Pick random $x \in Z_q$ and set the secret to $g^x$. Pick random $t-1$-degree polynomial $X$ with coefficients in $Z_q$, such that $X(0) = x$. Set $x_i = X(i)$.

$s' \leftarrow \text{SS.Combine}(\{x_{i_1}, \ldots, x_{i_l}\})$.

Compute
$$s' = g^{\sum_{p=1}^{p=l} x_{i_p} \lambda_p}$$

where $\lambda_p = \prod_{1 \leq k \leq l}^{k \neq p} \frac{x_{i_k}}{x_{i_k} - x_{i_p}}$.

Fig. 1

$\{s, s_1, \ldots, s_n\} \leftarrow \text{CRD.Share}(-, t, n)$.

Run $g^x$, $\{x_1, \ldots, x_n\} \leftarrow \text{SS.Share}(-, t, n)$. Pick $H(\cdot) : \{0,1\}^* \rightarrow G$ to be a cryptographic hash function that maps random strings in $G$. Pick random $t-1$-degree polynomial $Y$ with coefficients in $Z_q$, such that $Y(0) = 0$, and denote $y_i = Y(i)$. The secret is set to $s = g^x$ while each share is set to $s_i = (x_i, y_i)$.

$s' \leftarrow \text{CRD.Combine}(\{s_{i_1}, \ldots, s_{i_t}\})$.

Parse $s_{i_p} = (x_{i_p}, y_{i_p})$, run $s' \leftarrow \text{SS.Combine}(\{x_{i_1}, \ldots, x_{i_t}\})$, and output $s'$.

$d_{i,j} \leftarrow \text{CRD.Delegate}(s_i, U_j)$.

Parse $s_i = (x_i, y_i)$ and output $d_{i,j} = g^{x_i} H(U_j)^{y_i}$.

$s' \leftarrow \text{CRD.DCombine}(\{d_{i_1, j_1}, \ldots, d_{i_t, j_t}\})$.

Run $s' \leftarrow \text{SS.Combine}(\{d_{i_1, j_1}, \ldots, d_{i_t, j_t}\})$ and output $s'$.

Fig. 2

```
for j = 1, ..., log(n) do
    for l = 0, ..., 2^j − 1 do
        for i = 0, ..., 2^{j−1} − 1 do
            x^j[i+l*(2^j)], x^j[i+l*(2^j)+2(j−1)] = E(K, x^{j−1}[i+
            l*(2^j)], x^{j−1}[i+l*(2^j)+2(j−1)])
        end for
    end for
end for
```

Fig. 3

METHOD AND SYSTEM FOR ENFORCING ACCESS CONTROL POLICIES ON DATA

CROSS REFERENCE TO RELATED APPLICATIONS

This application is a U.S. National Phase application under 35 U.S.C. §371 of International Application No. PCT/EP2014/058398 (WO 2014/174045 A1), filed on Apr. 24, 2014, and claims benefit to European Patent Application No. EP 13165172.1, filed Apr. 24, 2013.

FIELD

The present invention relates to a method for enforcing access control policies on data owned by a plurality of users. The present invention further relates to a system, preferably a cloud storage system, for enforcing access control policies on data owned by a plurality of users. The present invention also further relates to a use of a cloud storage application programming interface.

BACKGROUND

Cloud storage provides in a convenient way a sharing of files for users and enables collaborations between users working on the shared files. Conventional cloud storage platforms have the principle of a centralized file ownership: A file is owned by a single user who then unilaterally decides all access requests to "his" file. However collaborations that could benefit from cloud storage are in most cases not suited for such a centralized ownership.

For example when considering a scenario where a number of research organizations would like to set up a repository to collaborate on a joint research project. A cloud would be a conventional solution to host this repository. If all participants contribute their research efforts to the joint research project, then they may also want to share the ownership over the collaborative data so that all ownership and access decisions are agreed upon among the owners. One of the advantages of such a shared ownership is that for example a sole owner cannot abuse the given trust by ignoring other owners and unilaterally making decisions. This advantage is even more important since users tend to increasingly store most or all of their data in the cloud storage without keeping local copies.

Even if owners are willing to choose and trust one of them with unilateral decision rights this trusted user may not want to be held accountable for collecting and correctly evaluating the access policies of other owners: For example, incorrect evaluations may incur negative reputation, financial penalties, or the like. If this is the case no user would like to become the accountable party.

Apart from the above collaboration considerations further aspects are the correct enforcement of individual access policies set by the respective file owners as well as the security against adversaries. In particular security means on the one hand that an adversary is not enabled to gain access to shared content for which he has not granted access to and on the other hand to prevent access to a shared content from users who have corresponding access rights.

Conventional authorization logics—for example shown in the non patent literature of M. Y. Becker, C. Fournet, and A. D. Gordon, "SecPAL: Design and Semantics of a Decentralized Authorization Language", in Journal of Computer Security (JCS), pages 597-643, 2010 rely on the presence of designated policy decision point components for evaluation of access policies. For a Datalog-based language such as SecPAL the policy decision points can be based on a generic Datalog interpreter. However these policy decisions points cannot be deployed within a third-party cloud system. Another disadvantage is that such distributed authorization languages assume a centralized ownership of resources and as such they rely on an administrator user to define and modify the access policies.

Conventional enforcement methods which are for example based on Attribute-Based Encryption as mentioned in the non patent literature of V. Goyal, O. Pandey, A. Sahai, and B. Waters, "Attribute-based encryption for fine-grained access control of encrypted data", in Proceedings of the $13^{th}$ ACM conference on Computer and communications security, pages 89-98, 2006 or in the non-patent literature of A. Sahai and B. Waters, "Fuzzy Identity-Based Encryption", in EUROCRYPT, pages 457-473, 2005 as well as based on the so-called multi-authority attribute based encryption as mentioned for example in the non-patent literature of M. Chase "Multi-authority attribute based encryption", in Proceedings of the $4^{th}$ conference on Theory of cryptography, pages 515-534, 2007 all require a single ownership of a file and as such the owner can always unilaterally decide to delete a file or to reencrypt a file by unilaterally changing corresponding thresholds. The decentralized attribute based encryption provide shares of a secret being blinded with shares of 0 such that if a user collects enough shares for the identity the blinding parameters can be cancelled out and the secret can be reconstructed. However a malicious holder of shares can compute additional delegations of the share to any other user.

SUMMARY

According to an embodiment, a method for enforcing access control policies on data owned by a plurality of users is provided. The method includes evaluating the access control policies of users, applying a collusion resistant sharing scheme for generating key shares of an encryption key and delegating the key shares to one or more designated users based on a result of the evaluation, and securely dispersing the data by applying an encryption scheme on all parts of data to be encrypted to produce encrypted data shares. The encryption scheme is provided such that for decryption of the encrypted data shares the encryption key and at least a predetermined number of data shares are required. The method also includes delegating each data share to one or more designated users, and distributing the data shares and the key shares to the respective designated users.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows procedures according to the Shamir secret sharing scheme;

FIG. 2 shows part of the steps of a method according to a first embodiment of the present invention; and FIG. 3 shows part of the steps of a method according to a second embodiment of the present invention.

DETAILED DESCRIPTION

Although applicable to storage and storage services in general, the present invention will be described with regard to cloud storage and cloud storage services.

Conventional enforcement methods cannot provide shared ownership but require an administrator. According to an embodiment, the present invention provides a method and a system for enforcing access control policies on data owned by a plurality of users enabling an easy enforcement of access policies for a shared ownership of data.

An embodiment of the present invention provides a method and a system for enforcing access control policies on data owned by a plurality of users enabling distributed enforcement of access controlled policies in agnostic clouds.

An embodiment of the present invention provides a method and a system for enforcing access control policies on data owned by a plurality of users which do not require an operator, superowner, or administrator for the data to decide whether other users have access to the data or not.

According to an embodiment, a method includes a) evaluating the access control policies of users, b) applying a collusion resistant sharing scheme, preferably based on secret sharing and attribute-based encryption, for generating key shares of an encryption key and delegating the key shares to one or more designated users based on a result of the evaluation of step a), c) securely dispersing the data by applying an encryption scheme on all parts of the data to be encrypted, preferably using an output of the collusion resistant secret sharing scheme as encryption key for encryption, resulting in encrypted data shares, wherein the encryption scheme is provided such that for decryption of the encrypted data the encryption key and at least a predetermined number of data shares are required, d) delegating each data share to one or more designated users, and e) distributing the data shares and the key shares to the respective designated users.

According to an embodiment, a system includes an evaluation module operable to evaluate the access control policies of users, a sharing module operable to apply a collusion resistant sharing scheme, preferably based on secret sharing and attribute-based encryption, for generating key shares of an encryption key and delegating the key shares to one or more designated users based on a result outputted by the evaluation module a dispersing module operable to securely disperse the data by applying an encryption scheme on all parts of the data to be encrypted, preferably using an output of the collusion resistant secret sharing scheme as encryption key for encryption, resulting in encrypted data shares, wherein the encryption scheme is provided such that for decryption of the encrypted data the encryption key and at least a predetermined number of data shares are required, a delegation module operable to delegate each data share to one or more designated users, and a distribution module operable to distribute the data shares and the key shares to the respective designated users.

According to an embodiment of the invention it has been recognized that an efficient information dispersal, for example in a cloud, is enabled.

According to an embodiment of the invention it has been further recognized that malicious users cannot pool their shares and acquire access to data or a file for which they are not entitled to have access rights to.

According to an embodiment of the invention it has been even further recognized that conventional cloud application programming interfaces can be used to enforce access control policies in a completely decentralized manner.

According to an embodiment of the invention it has been even further recognized that flexibility is enhanced since for example given a set of owners of files, the file can be spread among account owners on a cloud and each owner can exert his arbitrary access control policy on the portion of the file on his account and corresponding thresholds for the number of predetermined data shares are derived from the evaluation of each owner's individual policy. For example if an owner wants to grant read access to a user to a file then the owner allows the user to read the portion of the file stored on his account. As a result if the user is granted read access to at least the predetermined number of pieces of the file from the same number of distinct owners then the user may be granted read access to the file.

In other words, an embodiment of the present invention provides secure file dispersal and a collusion resistant delegation: Secure file dispersal ensures that users that do not have access to a certain number of tokens or file shares cannot acquire any information about the file in total unless they have already stored a considerable portion of the corresponding file, for example in a prior read operation. On the other hand the collusion resistant delegation together with the secure file dispersal ensures that users cannot pool their key shares and files shares together in order to access file that they cannot access otherwise. The individual user access control policies are at the beginning evaluated and based on the evaluation the key shares and the data shares are then delegated respectively dispersed to the respective users. This ensures a reliable delegation and distribution of shares to the respective users.

According to a preferred embodiment the encryption scheme of step c) is an all-or-nothing encryption, preferably using a symmetric algorithm for both encryption and decryption, in particular preferably being length preserving. Using an all-or-nothing encryption with a preferably symmetric algorithm, i.e., the same algorithm is used for both file encryption and file decryption enables an easy implementation and fast execution of the encryption scheme.

According to a further preferred embodiment the encryption scheme of step c) uses a fast-Fourier transform. This enables in particular in combination with an all-or-nothing encryption to reduce the encryption rounds to a total of log(n) encryption rounds with n being the number of blocks of the input data to be encrypted.

According to a further preferred embodiment the collusion resistant sharing scheme comprises a threshold secret sharing scheme, preferably in form of a Shamir secret sharing scheme. The Shamir secret sharing scheme provides a perfect secret sharing scheme and the reconstruction of the secret is possible with only a subset of the secret to be known. However, Shamir secret sharing does not provide collusion resistance. Thus a reliable secret sharing of shares is provided when for example combined with the attribute-based encryption to provide collusion resistance of key shares.

According to a further preferred embodiment decrypting of the encrypted data is performed when the number of accessible key shares and file shares are above the respective thresholds. This enables in an easy way to decrypt the encrypted data in the decentralized manner. Even further flexibility is enhanced since for example revocation of access to key shares of file shares revokes also access to the corresponding encrypted data and therefore decryption is not possible anymore.

According to a further preferred embodiment for storing data of users a cloud storage is used wherein each user of the plurality of users has a personal account for storing a part of the data to be encrypted and with its access control policy for controlling access to the data. This enables an easy implementation of the method in a cloud storage system.

According to a further preferred embodiment for changing access control to the data one or more users are allowed and/or restricted to access data shares and key shares of other one or more users. This further enhances the flexibility, since access control can be simply changed, for example by restricting the access to the corresponding shares by a user or a group of users. Therefore an update of the access control policy of a user or a plurality of users can be performed easily and quickly.

According to a further preferred embodiment a forward error correction coding, preferably a linear block code, preferably a Reed-Solomon coding is used in step c). This enables to disperse information even more efficiently.

FIG. 1 shows procedures according to the Shamir secret sharing scheme.

In FIG. 1 the algorithms SS.Share and SS.Combine according to the Shamir secret sharing scheme are shown: The secret is set to $g^x$ for a random to chosen x. The encryption key and when performing the collusion resistant delegation the encryption key $K=g^x$ is outputted at the beginning. This encryption key K, which as already mentioned may be outputted by a collusion resistant delegation procedure may then be used to encrypt the file in the secure file dispersal procedure.

The SS.Share procedure works in detail as follows: A cyclic group G having prime order is picked such that the discrete logarithm fulfills a hardness criterion. A random number out of a integer field of order q is chosen and the generator g of the group together with the random number is used as secret or encryption key respectively: $s=g^x$ Then a polynomial X of degree t−1 is picked with coefficients in integer field of order q such that $X(0)=x$ and $X(i)=x_i$ with $i<t$.

For decryption, i.e. reconstruction of the polynomial X and obtaining the secret the SS.Combine procedure uses the Lagrange-interpolation with appropriately chosen coefficients.

FIG. 2 shows in the following such a collusion resistant delegation procedure, preferably performed prior to the secure file dispersal as mentioned above.

FIG. 2 shows part of the steps of a method according to a first embodiment of the present invention.

The collusion resistant delegation procedure comprises the procedures CRD.SHARE, CRD.COMBINE, CRD.DELEGATE and CRD.DCOMBINE. The CRD.SHARE-procedure is based on the Shamir secret sharing procedure as well as the CRD.COMBINE-procedure. The CRD.DELEGATE-procedure is used to delegate the shares $s_i$ to corresponding users $U_j$ resulting in a delegation $d_{i,j}$ and the CRD.DCOMBINE-procedure uses the CRD.Combine-procedure for the corresponding delegations $d_{i,j}$ of the shares $s_i$ to reconstruct respectively output the reconstructed secret s'. The delegations $d_{i,j}$ of the shares $s_i$ to users $U_j$ are generated according to attribute-based encryption. For example in the CRD.Share-procedure a cryptographic hash function H(.) is chosen mapping random strings within the cyclic group G chosen in the SS.Share-procedure. This cryptographic hash function H(.) is then combined with the generator of the cyclic group G with one part $x_i$ of the key share $s_i$, with the user $U_j$ and a second part of the key share $y_i$. The CRD.COMBINE-procedure as well as the SS.COMBINE-procedure is preferably based on the corresponding procedures as shown in FIG. 1.

FIG. 3 shows part of the steps of a method according to a second embodiment of the present invention.

In FIG. 3 a secure file dispersal scheme is shown using an all-or-nothing transform scheme AONT based on fast-Fourier transform FFT which is performed as follows: A file F is divided into n input blocks x1, ..., xn. λ denotes the size of each block. A block cipher E: $\{0, 1\}^{2\lambda} \times \{0, 1\}^{2\lambda} \rightarrow \{0, 1\}^{2\lambda}$ is used, e.g., E(.) could correspond to AES256, with λ=128). This FFT-AONT is a symmetric algorithm (i.e., the same algorithm is used for both file encryption and file decryption) and is length-preserving. FFT-AONT results in a total of n log(n) block encryptions performed in a total of log(n) encryption rounds. In summary FIG. 3 E(X, Y, Z) encrypts Y∥Z using encryption key X with E(.) being a block cipher.

The procedures as shown in the FIG. 1-3 above can be used for example with a cloud storage in which each user has a personal account in which he or she stores his or her portion of the files and applies his/her own access control policies on files stored within the folder. In detail a cloud storage platform S may used where a finite number of users $U=\{U_1, \ldots, U_N\}$ have personal accounts onto which they can upload files. Each user $U_i$ knows the identities and the public keys of other users in the plurality of users U. Each user $U_i$ authenticates himself to the cloud storage platform S before downloading and/or uploading content. When a user $U_i$ uploads a file to his account he then decides who has access to this file. The cloud storage platform S enables each user to define for each of his files an access control policy of the type: Subjects×Actions→{grant, deny}. A creator of the file who would like to delegate access rights according to his access control policy applies the above mentioned collusion resistant delegation scheme to delegate key shares in a collusion resistant way to the designated one or more users.

Upon performing the collusion resistant delegation the output of this procedure is then used as encryption key to encrypt the file. The creator of the file then spreads respectively distributes the key shares and the file shares to each user according to the secret file dispersal scheme. If users would like another user to have access to the file then this user is given access to their file shares and key shares. If a user has enough key shares and file shares, i.e. the number of key shares and file shares are above the corresponding threshold then the corresponding user can recover the entire file blocks and decrypt them. Other users cannot collude.

As a result if a user $U_i$ is granted read access to at least t pieces of the file F from t distinct owners then the user $U_i$ is granted to read access to the whole file F. In this case even if some user delete their portions of the file F, F can still be recovered provided that there are enough pieces of the file F that can be accessed by other users.

In summary, an embodiment of the present invention enables efficient information dispersal and an all-or-nothing transform together with a collusion resistant share delegation to yield distributed enforcement of access control policies in agnostic clouds. The present invention further leverages existing cloud application programming interfaces to enforce decentralized and threshold-based access control on files stored in the cloud. Even further the present invention ensures that malicious users cannot put their shares together and acquire access to a file for which they are not entitled to have access rights to. Even further the present invention enforces access control policies in a completely decentralized manner.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling access to data owned by a plurality of users, the data being stored at a cloud storage platform at which each of the plurality of users has a personal account to which files can be uploaded, the method comprising:
   a) evaluating access control policies exerted by the plurality of users on the data owned by the plurality of users;
   b) generating key shares of an encryption key and delegating, based on the access control policies, the key shares to one or more designated users, wherein the generating key shares and the delegating the key shares is performed according to a collusion resistant sharing scheme;
   c) producing encrypted data shares by applying an encryption scheme on all parts of the data owned by the plurality of users so as to securely disperse the data owned by the plurality of users, wherein according to the encryption scheme, decryption of encrypted data requires the encryption key and at least a predetermined number of the data shares;
   d) delegating each of the encrypted data shares to the one or more designated users; and
   e) distributing the data shares and the key shares to the one or more designated users.

2. The method according to claim 1, wherein the encryption scheme is an all-or-nothing encryption being length preserving.

3. The method according to claim 1, wherein the encryption scheme uses a fast-Fourier-transform.

4. The method according to claim 1, wherein the collusion resistant sharing scheme comprises a threshold secret sharing scheme.

5. The method according to claim 4, wherein according to the encryption scheme, decryption of encrypted data requires a number of accessible key shares and a number of data shares that are above respective thresholds.

6. The method according to claim 1, wherein a part of the data owned by the plurality of users is stored at each of the personal accounts to which files can be uploaded.

7. The method according to claim 1, further comprising allowing or restricting one or more of the one or more designated users to access the data shares and the key shares of one or more other ones of the one or more designated users so as to modify accessibility of the data.

8. The method according to claim 1, wherein the securely dispersing the data owned by the plurality of users utilizes a forward error correction coding.

9. A system for controlling access to data owned by a plurality of users, the system comprising:
   a cloud storage platform at which each of the plurality of users has a personal account to which files can be uploaded,
   wherein the system is configured to:
      evaluate access control policies exerted by the plurality of users on the data owned by the plurality of users,
      generate key shares of an encryption key and delegate the key shares to one or more designated users based on the access control policies, wherein generating key shares and delegating the key shares is performed according to a collusion resistant sharing scheme;
      produce encrypted data shares by applying an encryption scheme on all parts of the data owned by the plurality of users so as to securely disperse the data owned by the plurality of users, wherein according to the encryption scheme, decryption of the encrypted data requires the encryption key and at least a predetermined number of the data shares,
      delegate each data share to the one or more designated users, and
      distribute the data shares and the key shares to the one or more designated users.

10. The method according to claim 1, further comprising using a cloud storage API.

11. The method according to claim 1, wherein the collusion resistant sharing scheme is based on secret sharing and attribute-based encryption, and
   wherein the encryption key is an output of the collusion resistant secret sharing scheme and is used by the encryption scheme for encryption.

12. The method according to claim 2, wherein the all-or-nothing encryption uses a symmetric algorithm for both encryption and decryption.

13. The method according to claim 4, wherein the threshold secret sharing scheme is in the form of a Shamir secret sharing scheme.

14. The method according to claim 8, wherein the forward error correction coding is a linear block code.

15. The method according to claim 14, wherein the linear block code is a Reed-Solomon coding.

16. The system according to claim 9, wherein the collusion resistant sharing scheme is based on secret sharing and attribute based encryption, and
   wherein the encryption key is an output of the collusion resistant secret sharing scheme and is used by the encryption scheme for encryption.

17. The method according to claim 1, wherein the access control policies exerted by the plurality of users include, for each respective user, access control policies exerted by the respective user on a portion of the data stored at a personal account of the respective user.

* * * * *